Figure 1:
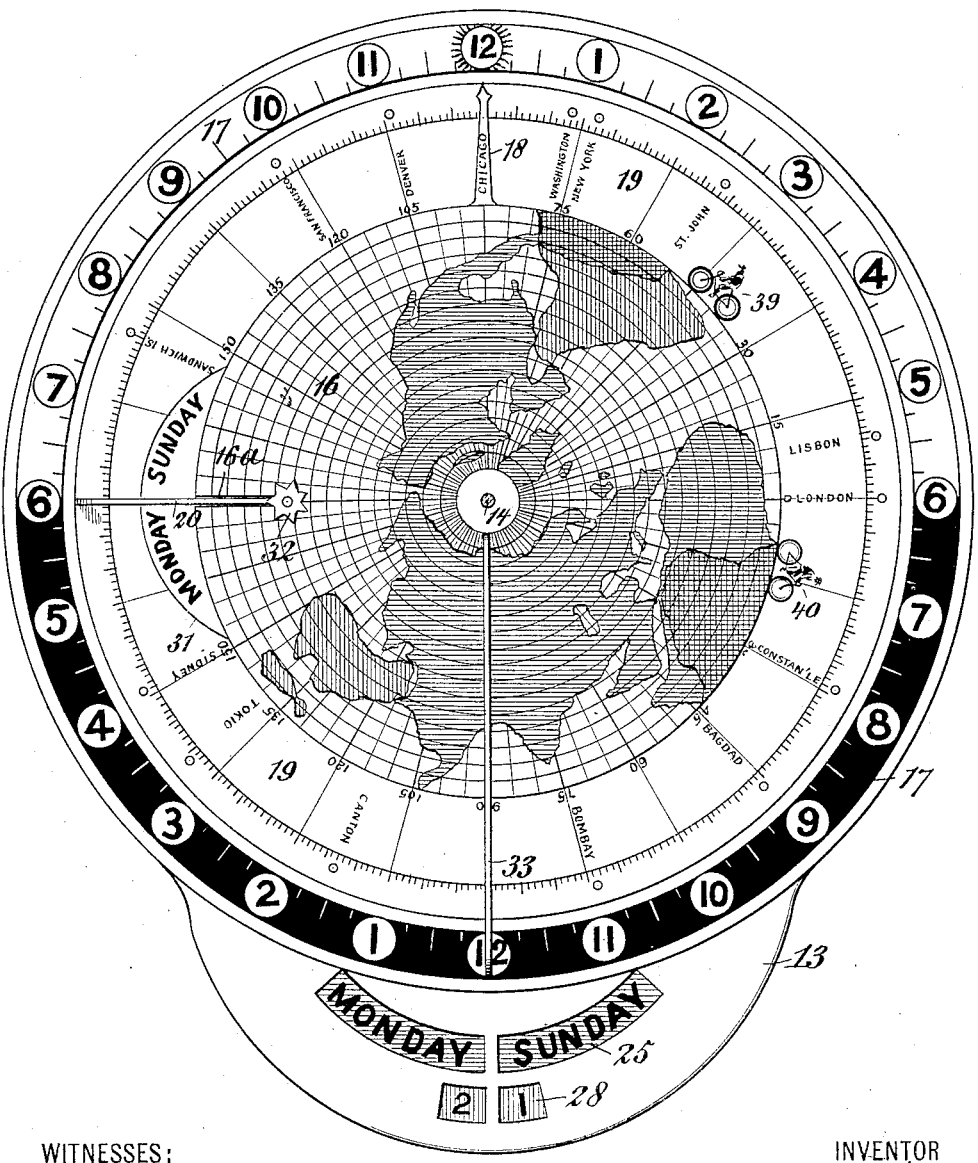

(No Model.) 3 Sheets—Sheet 1.

H. MARGOLIS.
GEOGRAPHICAL CLOCK.

No. 594,410. Patented Nov. 30, 1897.

WITNESSES:
D. H. Hayward
J. H. Banton

INVENTOR
Hirsh Margolis
BY Charles M. Boorman
ATTORNEY (No Model.) 3 Sheets—Sheet 2.

H. MARGOLIS.
GEOGRAPHICAL CLOCK.

No. 594,410. Patented Nov. 30, 1897.

WITNESSES:

INVENTOR
Hirsh Margolis
BY Chas. M. Brennan
ATTORNEY (No Model.) 3 Sheets—Sheet 3.
H. MARGOLIS.
GEOGRAPHICAL CLOCK.

No. 594,410. Patented Nov. 30, 1897.

WITNESSES:

INVENTOR
Hirsh Margolis
BY Charles M. Brosman
ATTORNEY

UNITED STATES PATENT OFFICE.

HIRSH MARGOLIS, OF NEW YORK, N. Y.

GEOGRAPHICAL CLOCK.

SPECIFICATION forming part of Letters Patent No. 594,410, dated November 30, 1897.

Application filed July 29, 1897. Serial No. 646,395. (No model.)

*To all whom it may concern:*

Be it known that I, HIRSH MARGOLIS, a subject of the Czar of Russia, residing in New York city, county and State of New York, have invented a new and useful Improvement in Clocks, of which the following is a specification, reference being had to the accompanying drawings, forming a part thereof.

My invention relates to what may be termed "geographical calendar-clocks," in which the time of the day is indicated simultaneously for all parts of the world by means of a disk provided with a map rotating with the hour-hand and surrounded by a stationary ring having indicated thereon the twenty-four divisions for the hours of one day; and my invention consists, in addition to the above, of a mechanism having disks provided with the names of the days of the week and dates of the month and adapted to rotate in unison with the revolution of the hour-hand and map-disk, of indicators or travelers having a movement relatively with the map-disk, but at a different speed thereto, and of certain lines of demarcation carried by the map-disk and by a stationary portion indicating the international dividing-line between the days of the week and the position on the map at which the change takes place at midnight.

The object of my invention is to show in one apparatus at once what time of the day or night it is, and also what day of the week and date of the month at any moment at any and all portions of the globe.

A further object of my invention is to illustrate for educational purposes or the like how a traveler making a circuit of the globe will apparently lose or gain a day according as he is traveling in a westerly or easterly direction.

I also show and illustrate by my device that each day of the week exists upon some portion of the globe for forty-eight hours, the day starts upon a small portion of the globe and gradually spreads all over the same and then gradually disappears, the time from the first appearance of the day on any portion of the globe to its appearance on all portions being twenty-four hours, and the time elapsing during its disappearance being another twenty-four hours, or forty-eight hours in all.

My invention further consists in certain novel improvements and in details of construction, as will hereinafter be more fully described and illustrated.

I will now proceed to describe my invention with reference to the accompanying drawings, and then point out the novel features in claims.

Figure 2:
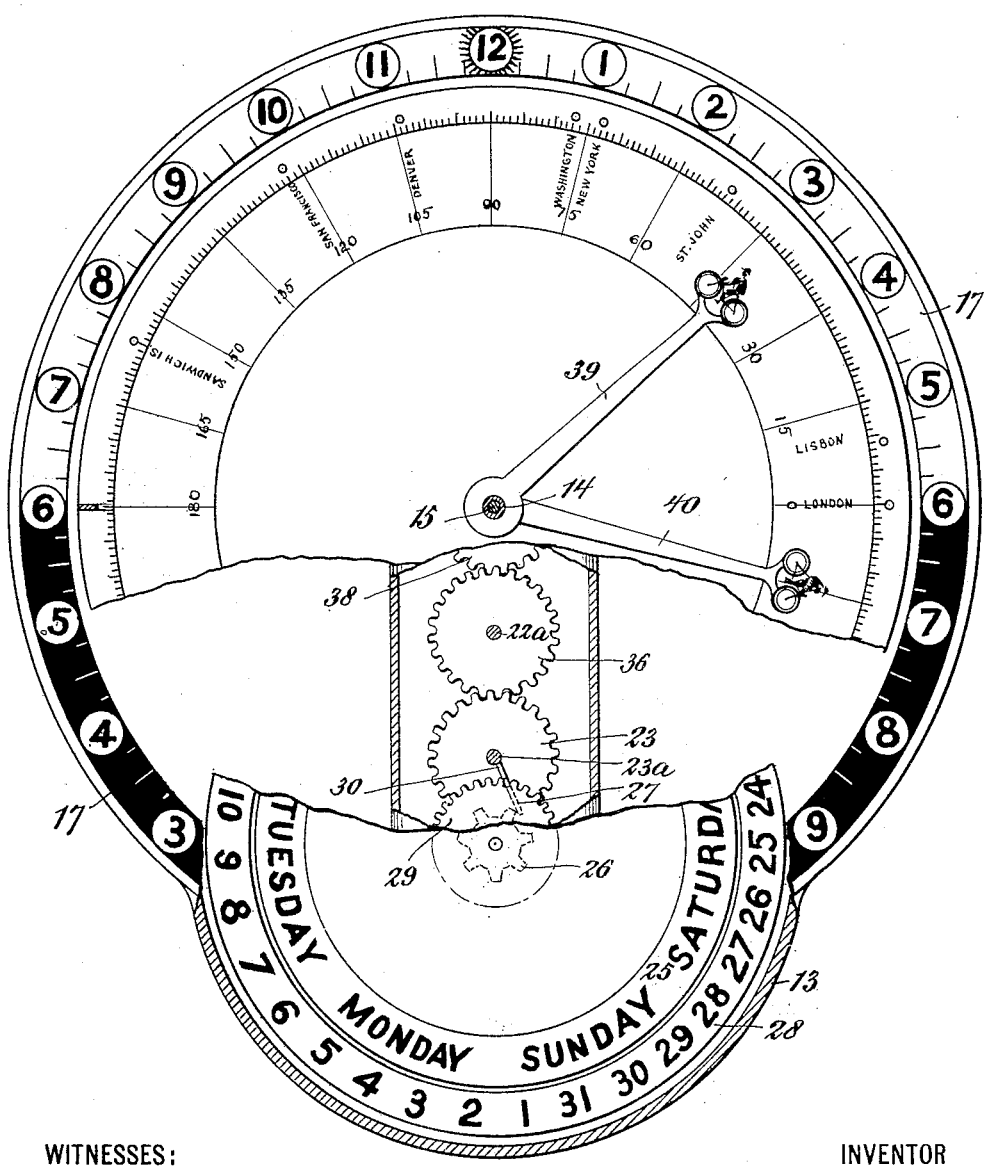
Figure 3:
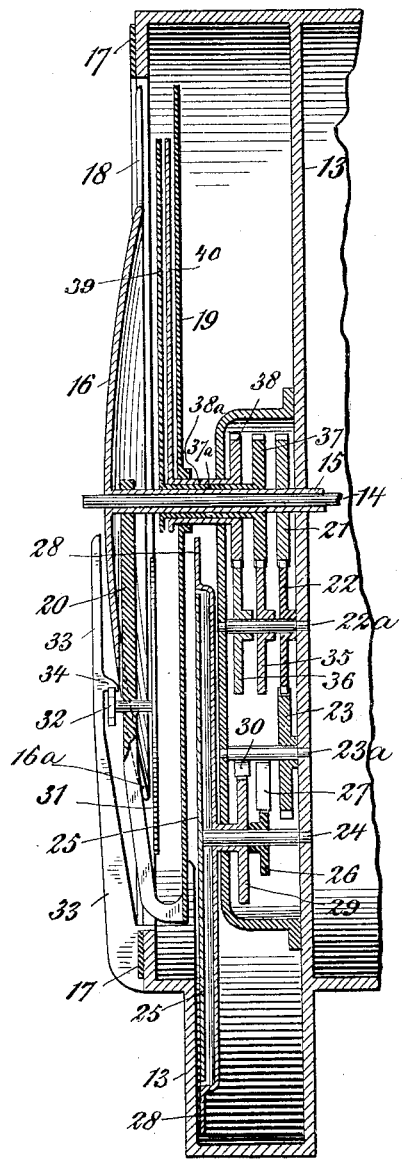

In the drawings, Figure 1 represents a face view of a geographical calendar-clock embodying my improvements. Fig. 2 is a similar view with certain portions broken away or removed to illustrate other parts in the rear thereof. Fig. 3 is a central vertical section, and for purposes of clearer illustration in this figure the various parts have been turned around into different positions to which they are shown in the other views.

Similar reference-characters denote corresponding parts in all the figures.

13 designates a frame or casing to which the several parts comprised in my geographical calendar-clock are attached or in which they are mounted, and to the rear of which may be attached or mounted an ordinary clock-train with actuating means, such as a weight or spring, and from which the central axle or shaft 14 and the sleeve 15 may derive their motion. The shaft 14 may be termed the "minute-axle" and the sleeve 15 the "hour-axle," having the usual ratio of twenty-four to one, as is common in twenty-four-hour clocks.

16 designates a disk rigidly mounted upon the sleeve or hour axle 15, and, as will be seen by reference to Fig. 1, upon this disk is represented a map comprising the northern and southern hemispheres, the one drawn upon the other. To avoid confusion arising from one map being drawn upon the other, I have shaded the portion comprising the land of the northern hemisphere by horizontal lines (reference being had to the position of the map-disk as shown in Fig. 1) and the portion comprising the land of the southern hemisphere by perpendicular lines. The crossing of the lines will thus indicate land on both hemispheres. In practice I may denote them by different colors, if desired, or otherwise. The effect produced will be as if a map of the world were reproduced on a glass globe and a view were taken of same on a line passing through the poles or axis of the earth.

17 designates a ring or dial secured to the casing concentrically with the map-disk and axles and divided upon its face into twenty-four parts, indicating the twenty-four hours of the day. These one-twenty-fourth parts may be again divided and subdivided, as may be desired. The hour twelve midday is represented by the numeral "12" at the top of the casing and is surrounded by rays representing the midday sun. Twelve o'clock midnight is represented by a similar numeral at the lower side of the casing. The entire lower half of the casing is preferably represented, as shown, by dark shading, and the upper half left light to clearly distinguish between the corresponding hours of night and day. This ring or dial may be said to indicate the firmament in which the mundane sphere revolves.

18 designates an hour-hand or pointer which may be attached to any portion of the periphery of the disk, depending upon the place at which it is desired that the clock shall normally indicate the time. As the clock is now set the hour-hand is arranged to indicate the time at Chicago, it being exactly twelve o'clock midday thereat. The time at any other place in the world may be read by noting the hour at a point opposite the meridian in which such place is located.

19 designates a disk loosely mounted on a sleeve to be presently described. The disk 19 is rigidly attached to the map-disk 16 by means of an arm 20 and rotates with it. The map-disk 16 has a slot 16ª, through which a portion of this arm is adapted to pass. The portion of the disk 19 which shows beyond the disk 16 is subdivided into three hundred and sixty parts to indicate meridial lines, and coincidently with these lines may be marked the name of the principal city through which the particular line passes. This arrangement will be found to very much facilitate the reading of the time at the different cities.

21 designates a gear-wheel provided with twenty-four teeth. This gear-wheel 21 meshes with another twenty-four-tooth wheel (designated by the reference-character 22) secured upon a shaft 22ª, mounted in the casing, and which in turn meshes with a third twenty-four-tooth wheel (designated by the reference-character 23) secured upon a shaft or arbor 23ª.

24 is a shaft or arbor mounted in the casing, upon which is secured the disk 25, having marked upon the face thereof the days of the week. 26 is a seven-tooth wheel also secured upon the arbor 24, and hence adapted to rotate therewith. The disk 25 and tooth-wheel 26 are caused to make a step forward or rotate a distance of one-seventh of a revolution every time the map-disk and hour-hand make an entire revolution by the engagement of a projection or single tooth 27, secured upon the shaft 23ª, with the seven-tooth wheel 26.

28 is a disk secured upon a sleeve loosely mounted on the arbor 24, the portion of the disk showing beyond the disk 25 having marked thereon the days of the month from "1" to "31," inclusive. Secured upon the same sleeve is a thirty-one-tooth wheel 29, adapted to be rotated step by step by a single tooth or projection 30 upon the shaft 23ª in a like manner as hereinbefore described for the disk 25.

It will now be apparent that as the hour-hand and map-disk are arranged to make one complete revolution in a day of twenty-four hours the day of the week and of the month will be advanced one step at the completion of each revolution, the teeth or projections 27 and 30 being so arranged relatively to tooth-wheels 26 and 29 that such change shall take place when the meridian 180 comes opposite the time of twelve o'clock midnight.

31 designates a disk secured upon an arbor mounted in the arm 20, and hence adapted to rotate around the central axis of the clock with the disks 16 and 19. 32 is a seven-tooth wheel secured to the same arbor, and hence adapted to partake of the movement of the disk 31.

33 is an arm or bar secured to the frame or casing 13 and overhanging the disks, as clearly shown in Fig. 1 of the drawings.

34 is a tooth or projection secured to the arm or bar 33 and adapted to engage with the seven-tooth wheel 32 as it comes in the path thereof upon its rotation around the clock's axis. Upon such engagement the disk 31 is caused to revolve upon its own axis one-seventh of a revolution, and, being provided upon its face with the names of the days of the week, will cause a new name to be brought forward at this point at every revolution of the disks 16 and 19.

Reference being had more particularly now to Fig. 1, it will be seen that openings are provided in the casing 13, whereby two days of the week from the disk 25 and two dates of the month from the disk 28 may be seen at one time, and that by its relative position with the map-disk 16 two days of the week from the disk 31 are also disclosed at one time, the arm 33 forming a dividing-line opposite the any two days and dates on the disks 25 and 28 and the arm 20 dividing the days on the disk 31. To read the day and date at any place on the globe it is merely necessary to note between which sides of the arms or bars 20 and 33 the place is located and what day of the week is indicated on the disks between such sides. Thus as the clock is now set it is twelve o'clock midday Sunday and the first of the month in Chicago. In Bombay it is eleven o'clock Sunday night and the first of the month, while at Sydney it is four o'clock Monday morning and the second day of the month. As the clock now indicates, from meridian 90 to meridian 180 it is Monday, the second, while at all other points it is Sunday, the first.

Referring now again to Fig. 3, the shaft 22ª is provided with two gear-wheels 35 and 36, rigidly secured thereto. The gear-wheel 35 has twenty-three teeth and the gear-wheel 36 has twenty-five teeth. These gear-wheels 35 and 36 mesh with gear-wheels 37 and 38, respectively, each of which wheels has twenty-four teeth. The gear-wheel 37 is secured to the sleeve 37$^a$, which is loosely mounted on the shaft 15, and the gear-wheel 38 is secured on a sleeve 38$^a$, loosely mounted on the sleeve 37$^a$. The sleeves 37$^a$ and 38$^a$ have secured thereto travelers or indicators 39 and 40, respectively.

By the arrangement of gearing just described the travelers or indicators will rotate around the axis of the clock in the same direction as the map-disk, but the traveler 39, being geared through a twenty-three-tooth wheel, will make a revolution less one twenty-fourth of a revolution while the map-disk makes one whole revolution, and in like manner the traveler 40, being geared through a twenty-five-tooth wheel, will make a revolution and one twenty-fourth of a revolution in the same time. Thus both travelers will be moving around the clock in the same direction, but relatively to the map-disk the traveler 39 will be moving in a westerly direction and the traveler 40 in an easterly direction. The gaining or losing of one twenty-fourth of a revolution of the travelers going in an easterly or westerly direction, respectively, will be equivalent to the gain or loss of one hour's time per diem in the circumnavigation of the globe, and will clearly illustrate the point that a traveler moving with the sun will apparently gain time and a traveler moving away from the sun will apparently lose time. Assuming that the two travelers started together from a given point to circumnavigate the globe—say, for instance, Chicago, or meridian of 90—at twelve o'clock midday, and assuming that in one whole day of twenty-four hours (correct time) they can travel one twenty-fourth of the entire distance, then in traveling such distance, when it is again twelve o'clock midday at meridian 90 it will be eleven o'clock for traveler 39, moving in a westerly direction, at meridian 105, and one o'clock for traveler 40, traveling in an easterly direction, at meridian 75. Thus they will appear to have lost or gained one hour for each fifteen degrees that they traveled. Hence in three hundred and sixty degrees they will have gained or lost twenty-four hours, or one whole day. To correct this, an international dividing-line between the days of the week has been established, which runs through the Behring Sea, thence to the equator, and thence to the south pole. I have indicated this dividing-line approximately by the bar 20. (See Fig. 1.) Now, therefore, when a traveler moving in a westerly direction arrives at this line, which is about at meridian 180—say, for example, at six o'clock Sunday morning—upon crossing the line it becomes six o'clock Monday morning, or twenty-four hours later. Had he arrived at midnight Sunday night, upon crossing it would have been Tuesday morning, or he would have lost a whole calendar-day. In traveling in an easterly direction and arriving at this point—namely, meridian 180—at six o'clock Monday morning upon crossing the line it would be Sunday at six o'clock, or twenty-four hours earlier. Had he arrived at Sunday midnight, upon crossing the line it would again be Sunday morning, an apparent gain of a day. This is clearly shown and illustrated in my device by the position of the disks indicating the days of the week and their movements indicating the change of a day at the prescribed time. The arrangement of the disks clearly illustrates this, as the travelers are always in the day which is disclosed by the disks on the side of the line at which they are.

I have described my device herewith as adapted to be attached to a regular clock mechanism; but I do not wish to limit myself thereto, as I may manufacture the device as illustrated without such an attachment, such as for educational purposes, in which case the map-disk might be revolved by hand or otherwise. Neither do I wish to limit myself to the exact details of construction, as they might obviously be varied within wide limits without departing from the spirit or scope of my invention.

What I claim is—

1. In a geographical calendar-timepiece, the combination of a map-disk adapted to revolve, a stationary ring graduated for hours of the day, a disk graduated for the days of the week and mounted on a portion stationary with the ring, the said disk being arranged to disclose always two days of the week, means whereby the said disk may be partially rotated step by step relatively to the revolution of the map-disk, and a line of demarcation carried by the map-disk indicating the international dividing-line between the days of the week substantially as and for the purpose specified.

2. In a geographical calendar-timepiece the combination of a map-disk adapted to revolve, a stationary ring graduated for hours of the day, a disk graduated for the days of the week and mounted on a portion stationary with the ring, another disk graduated for the days of the week and mounted to travel with the map-disk, and means whereby the said disks may be partially rotated step by step relatively to the revolution of the map-disk substantially as specified.

3. In a geographical timepiece the combination of a map-disk adapted to revolve, a stationary ring graduated for hours of the day, a disk graduated for the days of the week and mounted on a portion stationary with the ring, the said disk being arranged to disclose always two days of the week, means whereby the said disk may be partially rotated step by step relatively to the revolution of the map-disk, and a line of demarcation carried by the map-disk indicating the international dividing-line between the days of the week with a traveler or indicator adapted to rotate with the map-disk, but at a relatively greater or less speed thereto substantially as and for the purpose specified.

4. In a geographical calendar-timepiece the combination of a map-disk adapted to revolve a stationary ring graduated for hours of the day, a disk graduated for the days of the week and mounted on a portion stationary with the ring, the said disk being arranged to disclose always two days of the week, a similar disk graduated for days of the month and mounted on a portion stationary with the ring, the said disk being arranged to disclose always two consecutive days of the month, another disk graduated for the days of the week and mounted to travel with the map-disk, the said disk being also arranged to disclose always two days of the week, and means whereby said disks may be partially rotated step by step relatively to the rotation of the map-disk substantially as specified.

5. In a geographical calendar-timepiece, the combination of a map-disk adapted to revolve, a stationary ring graduated for the hours of the day, a disk graduated for the days of the week and mounted on a portion stationary with the ring, the said disk being arranged to disclose always two days of the week, means whereby the said disk may be partially rotated step by step relatively to the revolution of the map-disk, a bar secured to a portion stationary with the ring and overhanging the map-disk, in a line passing through the center of the disk indicating days of the week, and the center of the map-disk, and a line of demarcation carried by the map-disk indicating the international dividing-line between the days of the week substantially as and for the purpose specified.

HIRSH MARGOLIS.

Witnesses:
J. H. BANTON,
SAML. S. WATTERS.